UNITED STATES PATENT OFFICE.

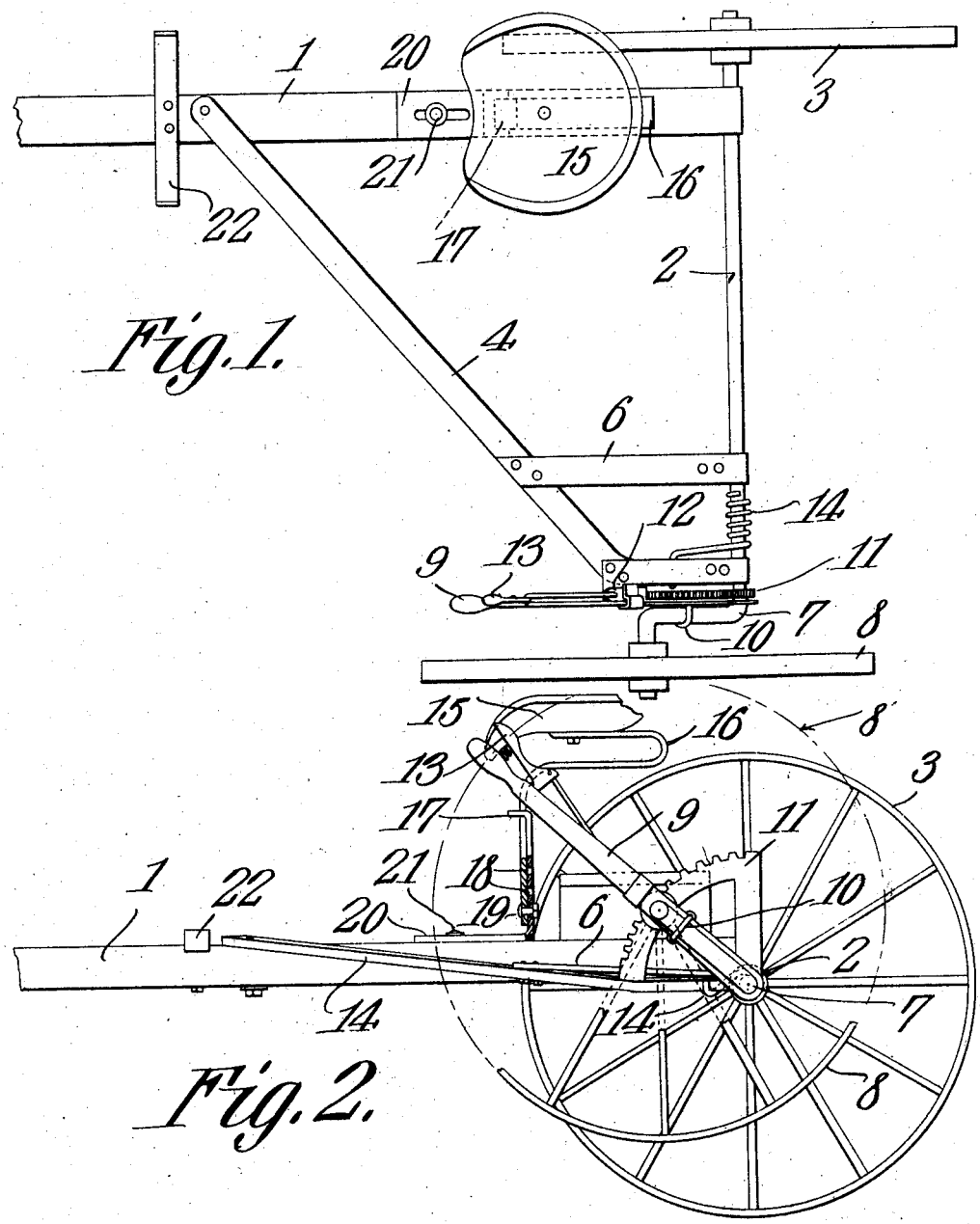

JAMES W. TURNER, OF SHELBYVILLE, MISSOURI.

SULKY ATTACHMENT FOR PLOWS.

No. 893,763.

Specification of Letters Patent.

Patented July 21, 1908.

Application filed February 2, 1907. Serial No. 355,464.

*To all whom it may concern:*

Be it known that I, JAMES W. TURNER, a citizen of the United States, residing at Shelbyville, in the county of Shelby and State of Missouri, have invented a new and useful Sulky Attachment for Plows, of which the following is a specification.

This invention relates to sulky attachments for plows and its object is to provide an attachment of this character having a ground wheel adapted to be adjusted to any height so as to maintain the attachment in a horizontal position when the other wheel is in a furrow.

A still further object is to provide simple means whereby the adjustment of the ground wheel may be quickly effected by the driver occupying the seat on the attachment.

A still further object is to provide means whereby the power required for adjusting the ground wheel is reduced to the minimum.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a plan view of the attachment, the front portion of the tongue being broken away; Fig. 2 is a side elevation thereof, a portion of the seat being removed and part of its support shown in section.

Referring to the figures by characters of reference, 1 is the tongue of the attachment the same forming a part of a frame and bearing upon a revoluble axle 2 one end of which is supported by a furrow wheel 3. This axle is journaled within a brace 4 fastened to the tongue 1 and extending laterally and rearwardly therefrom and is also journaled within a reinforcing strip 6 secured to the brace. Located at that end of the axle farthest removed from wheel 3 is a crank arm 7 supported by a ground wheel 8 which is similar to the wheel 3. A lever 9 extends from the axle 2 and is connected to the end portion of the crank arm by means of a bolt 10 so that when the lever is swung upon its fulcrum the crank arm 7 and the axle 2 will be moved therewith thereby increasing or diminishing the distance between the center of the wheel 8 and the horizontal plane occupied by the axle 2. A toothed segment 11 is secured upon the brace 4 and is adapted to be engaged by a spring pressed dog 12 slidably mounted on the lever 9 and adapted to be actuated by a small lever 13. A spring 14 is coiled around the axle 2 and one end thereof is secured to said axle while its other end is extended into engagement with the brace 4 or any other fixed portion of the attachment. This spring exerts a constant downward pressure upon the crank 7 said pressure being sufficient to almost if not entirely counterbalance the weight of the attachment to which the wheel 8 is subjected.

When the attachment is being drawn over a smooth surface the wheel 8 is adjusted so that its center occupies the same horizontal plane as the center of the wheel 3 and said wheel 8 is locked in position by the dog 12 which is seated in one of the notches in the segment 11. When the attachment is in position with its wheel 3 in a furrow the lever 9 is pressed downward so as to cause the adjoining portion of the attachment to move downward and assume a horizontal position after which said lever is locked as described. The spring 14 serves to aid the operator in swinging the crank 7 downward inasmuch as the same almost if not entirely counterbalances the weight of the adjoining side of the attachment.

It will be noticed that the adjustment can be quickly and accurately effected and by reason of the simplicity of construction of the device the attachment is very durable as well as efficient. It will be noticed that the driver's seat 15 is mounted on a spring support 16 which is slidably mounted in a standard 17. This standard has a series of openings 18 therein any one of which is adapted to receive a securing bolt 19 extending through the support and the base 20 of the standard is slotted longitudinally to receive a clamping device 21 such as a bolt whereby the standard can be adjusted forward or backward to meet various conditions. A foot rest 22 is arranged upon the beam in front of the seat.

While the attachment is especially designed for use in connection with plows it is to be understood that the same can be used with harrows, or any other agricultural machines desired.

What is claimed is:

An attachment of the character described comprising a straight shaft having an integral crank at one end, said shaft and crank being bodily revoluble, a ground wheel revoluble upon the crank, a furrow wheel revoluble upon the other end of the shaft, a frame mounted upon the shaft and extending forward therefrom, a lever secured to and extending from the shaft adjacent the crank, means for binding and securing said lever to the crank, said lever and crank being disposed in the same plane, a relatively fixed locking device carried by the frame and disposed to be engaged by the lever to lock the crank at any desired angle to the horizontal, and a spring secured to and coiled around the shaft, one end of the spring engaging the frame, said spring constituting resilient means for holding the crank normally in a predetermined position.

In testimony that I claim the foregoing as my own, I have hereto affixed my signature in the presence of two witnesses.

JAMES W. TURNER.

Witnesses:
T. W. HERBST,
E. M. DAMRELL.